(12) United States Patent
Wu et al.

(10) Patent No.: US 10,328,923 B2
(45) Date of Patent: Jun. 25, 2019

(54) SYSTEM AND METHOD OF VEHICLE TRANSIENT TORQUE MANAGEMENT

(71) Applicants: Cummins Intellectual Properties, Inc., Minneapolis, MN (US); PACCAR, Inc., Bellevue, WA (US); Eaton Corporation, Cleveland, OH (US)

(72) Inventors: An Wu, Columbus, IN (US); Vivek A. Sujan, Columbus, IN (US); Phani Vajapeyazula, Columbus, IN (US); Kenneth Follen, Greenwood, IN (US); Howard R. Frost, Columbus, IN (US)

(73) Assignees: Cummins Intellectual Properties, Inc., Minneapolis, MN (US); PACCAR, Inc., Bellevue, WA (US); Eaton Corporation, Cleveland, OH (US)

( * ) Notice: Subject to any disclaimer, the term of this patent is extended or adjusted under 35 U.S.C. 154(b) by 53 days.

(21) Appl. No.: 15/789,286

(22) Filed: Oct. 20, 2017

(65) Prior Publication Data
US 2018/0037213 A1 Feb. 8, 2018

Related U.S. Application Data

(63) Continuation of application No. 14/199,414, filed on Mar. 6, 2014, now Pat. No. 9,802,597.

(60) Provisional application No. 61/776,721, filed on Mar. 11, 2013.

(51) Int. Cl.
*B60W 10/00* (2006.01)
*B60W 10/06* (2006.01)
*B60W 10/30* (2006.01)
*F02D 41/02* (2006.01)
*F02N 11/08* (2006.01)

(52) U.S. Cl.
CPC ............ *B60W 10/06* (2013.01); *B60W 10/30* (2013.01); *F02D 41/021* (2013.01); *F02D 2200/501* (2013.01); *F02D 2200/701* (2013.01); *F02D 2200/702* (2013.01); *F02D 2250/26* (2013.01); *F02N 11/0837* (2013.01); *F02N 2200/124* (2013.01)

(58) Field of Classification Search
CPC ..... B60W 10/06; B60W 10/30; F02D 41/021; F02D 2200/501; F02D 2200/701; F02D 2200/702; F02D 2250/26; F02N 11/0837; F02N 2200/124
See application file for complete search history.

(56) References Cited

U.S. PATENT DOCUMENTS

| | | | | |
|---|---|---|---|---|
| 5,231,897 A * | 8/1993 | Morita | ................ | F16H 61/0213 477/120 |
| 5,983,156 A * | 11/1999 | Andrews | ............. | F02D 41/0007 180/167 |
| 6,151,549 A | 11/2000 | Andrews et al. | | |
| 6,387,011 B1 | 5/2002 | Bellinger | | |
| 6,873,898 B1 | 3/2005 | Kostadina | | |
| 6,944,532 B2 * | 9/2005 | Bellinger | .............. | B60W 10/06 123/350 |

(Continued)

*Primary Examiner* — Hieu T Vo
*Assistant Examiner* — Sherman D Manley
(74) *Attorney, Agent, or Firm* — Foley & Lardner LLP

(57) ABSTRACT

A system for establishing a torque limit for a vehicle is provided. The system uses impending terrain and speed conditions to determine an optimum torque, which improves engine efficiency and reduces fuel consumption.

17 Claims, 8 Drawing Sheets

(56) References Cited

U.S. PATENT DOCUMENTS

| | | | |
|---|---|---|---|
| 6,990,401 B2* | 1/2006 | Neiss | B60K 31/0058 |
| | | | 701/96 |
| 7,223,204 B2 | 5/2007 | Steen et al. | |
| 7,497,201 B2* | 3/2009 | Hollenbeck | F02D 41/2422 |
| | | | 123/435 |
| 8,744,718 B2* | 6/2014 | Johansson | B60K 31/00 |
| | | | 340/988 |
| 2007/0112475 A1* | 5/2007 | Koebler | B60L 3/12 |
| | | | 701/1 |
| 2008/0059036 A1* | 3/2008 | Imai | B60W 30/143 |
| | | | 701/93 |
| 2008/0167770 A1 | 7/2008 | MacDonald et al. | |
| 2008/0208393 A1* | 8/2008 | Schricker | G08G 1/20 |
| | | | 701/1 |
| 2008/0262712 A1* | 10/2008 | Duty | B60W 10/02 |
| | | | 701/123 |
| 2009/0043473 A1* | 2/2009 | Nakai | B60W 40/076 |
| | | | 701/70 |
| 2010/0010732 A1* | 1/2010 | Hartman | G01C 21/3469 |
| | | | 701/532 |
| 2011/0040438 A1* | 2/2011 | Kluge | G01C 21/3469 |
| | | | 701/31.4 |
| 2011/0106388 A1* | 5/2011 | Boeckenhoff | B60W 10/06 |
| | | | 701/70 |
| 2011/0257869 A1* | 10/2011 | Kumar | B61L 3/006 |
| | | | 701/103 |
| 2011/0313647 A1* | 12/2011 | Koebler | B60L 15/2045 |
| | | | 701/123 |
| 2012/0197501 A1* | 8/2012 | Sujan | B60K 23/00 |
| | | | 701/51 |
| 2012/0197504 A1* | 8/2012 | Sujan | G01C 21/3469 |
| | | | 701/70 |
| 2017/0096134 A1* | 4/2017 | Yoon | B60K 6/547 |
| 2018/0347479 A1* | 12/2018 | Nakamura | F02D 29/00 |

* cited by examiner

SYSTEM AND METHOD OF VEHICLE TRANSIENT TORQUE MANAGEMENT

CROSS-REFERENCE TO RELATED APPLICATIONS

This application is a continuation of U.S. patent application Ser. No. 14/199,414, entitled "SYSTEM AND METHOD OF VEHICLE TRANSIENT TORQUE MANAGEMENT," filed Mar. 6, 2014, which claims the benefit of and priority to U.S. Provisional Patent Application No. 61/776,721, entitled "SYSTEM AND METHOD OF VEHICLE TRANSIENT TORQUE MANAGEMENT," filed Mar. 11, 2013, both of which are incorporated herein by reference in their entireties.

TECHNICAL FIELD

The present disclosure relates to using future route information, which may be obtained by a global positioning system (GPS) or in other ways, to determine a required engine output power, and corresponding torque, for a desired target speed, while limiting the engine output torque.

BACKGROUND

The efficiency of an internal combustion engine is related to required torque from the engine. The more torque required, the harder an engine has to work. An engine will achieve optimal fuel efficiency and emissions if the engine torque is matched to the speed demands of the engine as a vehicle, in which the engine is located, travels over a known route.

SUMMARY

One embodiment relates to a method of operating a torque management system for an internal combustion engine including determining one or more segments of a route of a vehicle; receiving a plurality of inputs for each segment of the route, wherein the plurality of inputs includes at least one of route parameter data, a desired vehicle speed, vehicle parameter data, and vehicle operating condition data; determining a power output limit for an engine of the vehicle for each segment of the route; determining an engine torque output limit based on the power output limit; and providing the determined engine torque output limit to a vehicle device to limit an engine torque output for each route segment.

Another embodiment relates to a torque management system including a vehicle, the vehicle including an internal combustion engine and a transmission, and a processor coupled to the internal combustion engine and the transmission. The processor is configured to: determine one or more segments of a route of the vehicle; receive a plurality of inputs for each segment of the route wherein the plurality of inputs includes at least one of route parameter data, a desired vehicle speed, vehicle parameter data, and vehicle operating condition data; determine a power output limit for the engine for each segment of the route; determine an engine torque output limit based on the power output limit; provide the determined engine torque output limit to a vehicle device to limit an engine torque output for each route segment.

Still another embodiment relates to a computer-readable storage medium having machine instructions stored therein, the instructions being executable by a processor to cause the processor to perform operations, including: receiving identification of a route of travel of a vehicle; determining one or more segments of the route; receiving a plurality of inputs for each segment of the route, wherein the plurality of inputs includes at least one of route parameter data, a desired vehicle speed, vehicle parameter data, and vehicle operating condition data; determining a power output limit for an engine of the vehicle for each segment of the route; determining an engine torque output limit based on the power output limit; and providing the determined engine torque output limit to a vehicle device to limit an engine torque output for each route segment.

Advantages and features of the embodiments of this disclosure will become more apparent from the following detailed description of example embodiments when viewed in conjunction with the accompanying drawings.

DETAILED DESCRIPTION

Figure 1:
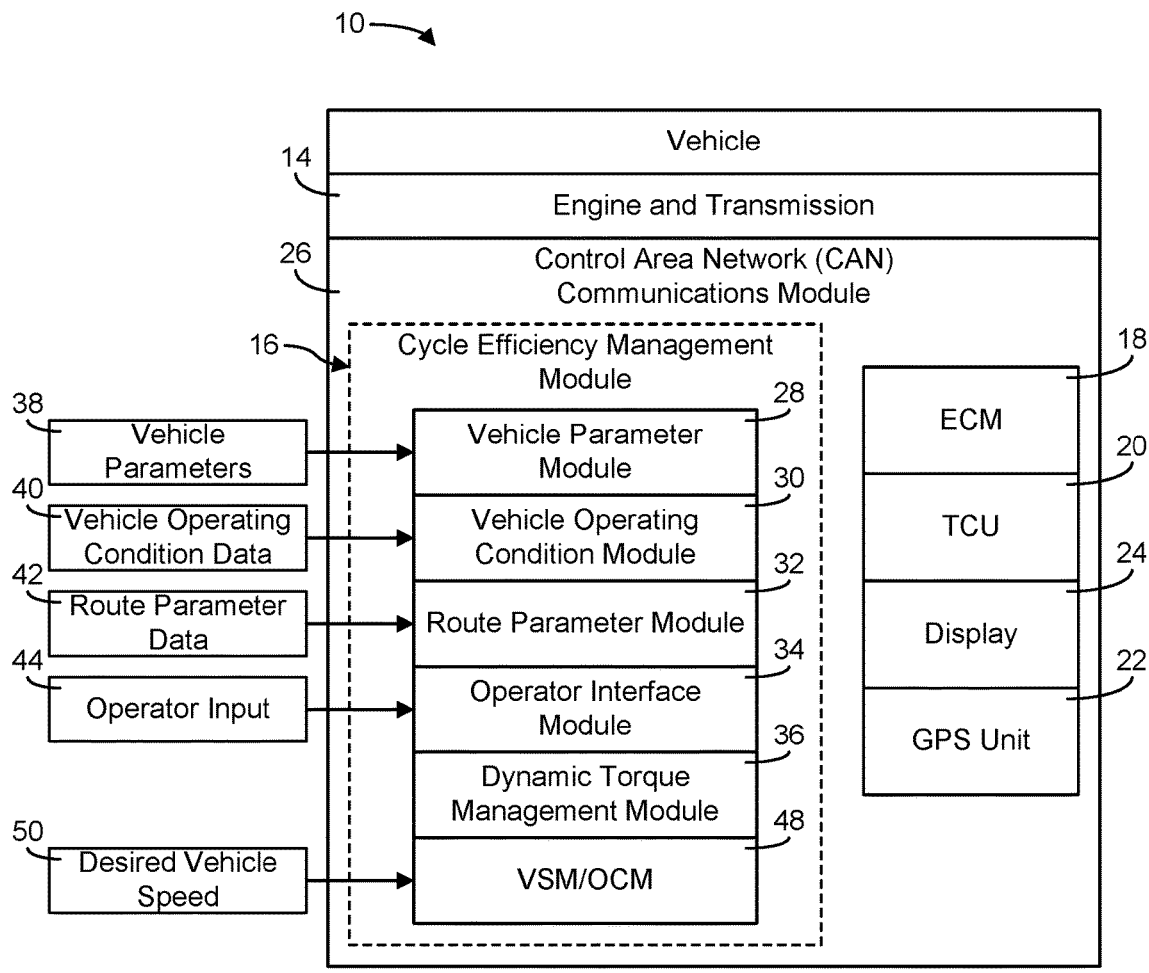
FIG. 1 is a system diagram for a vehicle including a dynamic torque management system in accordance with an example embodiment of the present disclosure.

When a vehicle operates on a road, the vehicle encounters situations requiring acceleration and deceleration. Such situations may include acceleration from one speed to another, or traveling up a grade. In order to respond to the need to climb a grade, or to accelerate or decelerate to change speed, an engine of the vehicle is required to change an output torque. In existing vehicles, such torque changes are controlled by an operator based on a transmission gear selection and an accelerator position (i.e., throttling). However, the operator may be unaware of an optimal torque to climb an impending hill or to accelerate from one speed to another speed. Because an operator is unaware of impending changes and of optimal torque to climb a hill or to change acceleration, an operator is likely to overestimate or underestimate the required torque, leading to inefficient operation of the engine and increased fuel consumption. In addition, the inefficient operation of the engine may lead to excessive emissions. The present disclosure provides a system and method for managing vehicle transient torque for optimal fuel consumption and reduced emissions under a variety of vehicle operating conditions. In certain embodiments, the present disclosure provides for efficient engine restarting during vehicle stop-and-go events via engine output torque control to improve fuel economy and operating costs. Specifically, by determining the optimal starting torque profile, smaller starter motors may be utilized thereby reducing total vehicle costs.

To provide for transient torque management, a Cycle Efficiency Management (CEM) module employs control processes to provide determined torque limits to control the output torque (and corresponding power) of a vehicle engine. The CEM control processes include inputs from a variety of vehicle systems and modules. The CEM processes use these inputs in one or more dynamic torque management calculations. These calculations are used to determine a torque output limit for the vehicle engine. The determined torque output limit is then provided by the CEM module to one or more vehicle devices to limit the engine torque output substantially in accordance with the determined torque output limit. The vehicle devices may include, but are not limited to, an operator input/output module (e.g. operator interface module 34) and/or an engine and/or a transmission controller. When embodied as the operator input/output module, instructions and/or information is provided to the operator of the vehicle to drive/control the vehicle to maintain the output torque below the torque limit. When embodied as an engine and/or a transmission controller (e.g., ECM 18, TCU 20, described herein), the output torque of the engine is controlled in accordance with the determined torque output limit. In turn, by implementing the torque output limit with the engine, the engine is operated with greater efficiency than would otherwise be possible, which minimizes fuel consumption.

Many aspects of the disclosure are described in terms of sequences of actions to be performed by elements of a computer system or other hardware capable of executing programmed instructions, for example, a general purpose computer, special purpose computer, workstation, or other programmable data processing apparatus. It will be recognized that in each of the embodiments, the various actions could be performed by specialized circuits (e.g., discrete logic gates interconnected to perform a specialized function), by program instructions, such as logical blocks, program modules etc. being executed by one or more processors (e.g., one or more microprocessor, a central processing unit (CPU), and/or application specific integrated circuit), or by a combination of both. For example, embodiments can be implemented in hardware, machine or computer readable instructions, firmware, middleware, microcode, or any combination thereof. The instructions can be program code or code segments that perform necessary tasks and can be stored in a machine-readable medium such as a storage medium or other storage(s). A code segment may represent a procedure, a function, a subprogram, a program, a routine, a subroutine, a module, a class, or any combination of instructions, data structures, or program statements. A code segment may be coupled to another code segment or a hardware circuit by passing and/or receiving information, data, arguments, parameters, or memory contents.

The non-transitory machine-readable medium can additionally be considered to be embodied within any tangible form of computer readable carrier, such as solid-state memory, magnetic disk, and optical disk containing an appropriate set of computer instructions, such as program modules and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or Flash memory), or any other tangible medium capable of storing information.

It should be noted that the system of the present disclosure is illustrated and discussed herein as having various modules and units which perform particular functions. It should be understood that these modules and units are merely schematically illustrated based on their function for clarity purposes, and do not necessarily represent specific hardware or machine readable instructions. In this regard, these modules, units and other components may be implemented in hardware (e.g., one or more processors) and/or implemented as machine readable instructions to substantially perform their particular functions explained herein. The various functions of the different components can be combined or segregated as hardware and/or program modules in any manner, and can be useful separately or in combination. Input/output or I/O devices or user interfaces including but not limited to keyboards, displays, pointing devices, and the like can be coupled to the system either directly or through intervening I/O controllers. Thus, the various aspects of the disclosure may be embodied in many different forms, and all such forms are contemplated to be within the scope of the disclosure.

Referring now to FIG. 1, a system diagram for a vehicle including a Dynamic Torque Management System (DTMS) in accordance with an example embodiment of the present disclosure is shown and generally indicated at 12. DTMS 12 is integrated into a vehicle 10. Vehicle 10 includes an engine and transmission 14. Vehicle 10 further includes a CEM module 16, an Engine Control Module (ECM) 18, a Transmission Control Unit (TCU) 20, a GPS unit 22, an operator interface and display 24, and a Communications Area Network (CAN) communications module 26.

Engine and transmission 14 include a plurality of gears into which the transmission can be shifted by TCU 20 or manually by an operator of vehicle 10. In other embodiments, the transmission includes a continuously variable transmission. ECM 18 receives control and/or data signals from CEM module 16 and TCU 20 by way of CAN communications module 26. Based on those signals, ECM 18 is adapted to generate control signals that are transmitted via CAN communications module 26 to the engine of vehicle 10. TCU 20 receives control and/or data signals from CEM module 16 and ECM 18 by way of CAN communications module 26. Based on those signals, TCU 20 is adapted to generate control signals that are transmitted via CAN communications module 26 to the transmission of vehicle 10. Operator interface and display 24 displays information to the vehicle 10 operator and accepts operator inputs relating to the control of vehicle 10. The displayed information is received via CAN communications module 26 and the operator inputs are transmitted by way of CAN communications module 26 to CEM module 16. Operator inputs accepted by way of operator interface and display 24 may be in addition to other operator inputs, such as a transmission gear shift position, and an accelerator position. As described herein, such operator inputs to operator interface and display 24 may include route selection/identification, an output torque limit, target speeds, and other data or information related to the operation of vehicle 10. GPS unit 22 provides GPS data to CEM module 16 by way of CAN communications module 26.

In the example shown in FIG. 1, CEM module 16 includes a vehicle parameter module 28, a vehicle operating condition module 30, a route parameter module 32, an operator interface module 34, a Dynamic Torque Management (DTM) module 36, and a Vehicle Speed Management/Operator Cost Management (VSM/OCM) module 48. Generally, a plurality of inputs/parameters, operating conditions, data, information, and operator inputs (referred to collectively as "dynamic vehicle data" or "vehicle dynamics") are provided to CEM module 16, including vehicle parameters 38, current vehicle operating conditions 40, route parameter data 42, a desired vehicle speed 50, and an operator input 44, via CAN communications module 26. The DTM module 36 uses a finite forward horizon window (described below herein) to determine a required or a substantially required engine output torque (i.e., the torque limit) based on the vehicle dynamics, including the desired vehicle speed.

Vehicle parameter module 28 is adapted to receive and contain vehicle parameters or data 38. Vehicle operating condition module 30 is adapted to receive and contain vehicle operating conditions or data 40. Route parameter module 32 is adapted to receive and contain route data 42 (e.g., route parameter data and GPS data). VSM/OCM module 48 is adapted to determine an optimal speed based on the route without sacrificing vehicle efficiency. VSM/OCM module 48 provides the desired speed, which may be a target speed, to DTM module 36. The desired speed may be received by an operator via a cruise control feature, an operator interface and display 24, or other operator input. Operator interface module 34 is adapted to receive and contain operator input or data 44. The torque and/or torque curve(s) calculated and provided by DTM module 36 provide the optimal output torque from engine and transmission 14 for the desired vehicle speed based on the dynamic vehicle data. The optimum torque is translated to an acceleration and communicated to engine and transmission 14, and may be communicated to display 24, with such communications conducted by way of CAN communications module 26 (i.e., the information is provided to a vehicle a device). As mentioned above, in one embodiment, the CEM module 16 (due to the DTM module 36 determination) directly controls engine and transmission 14 to substantially limit the engine output torque to the determined optimal output torque limit. In another embodiment, instructions and/or information regarding the optimal torque is provided to an operator via display 24 such that the operator may control one or more vehicle devices to substantially achieve the optimal torque (e.g., decrease or increase depression of the accelerator pedal, shift gears, etc.).

Referring further to FIG. 1, example embodiments provide for at least a portion of the route data to be provided by global positioning system ("GPS") as GPS data (e.g., latitude data, longitude data, altitude data) from GPS unit 22. The GPS data 42 may be provided in advance of an operation or in real-time as vehicle 10 is operated. Accordingly, as vehicle 10 is traveling a route, the CEM module 16 may receive GPS data relating to the route before the vehicle 10 reaches the portion on the route corresponding with the received GPS data. The received GPS data may be used by CEM module 16 to determine the torque output limit, such that the torque output limit may be determined in advance of implementation (i.e., before the vehicle reaches the route segment where the torque limit is applied).

Alternate embodiments provide for route parameter data 42 (including GPS data) to be maintained in a non-transitory memory unit 46 and downloaded to CEM module 16 prior to the start of a trip or transmitted wirelessly over-the-air at any time, for example, by using cellular technology. Non-transitory memory unit 46 may include non-volatile computer memory, fixed media such as CD's, DVD's, or the like, flash drives, or other memory devices capable of storing route parameter data 42. Example embodiments provide for ECM 18 to be separate from CEM module 16. Alternate embodiments provide for CEM module 16 and ECM 18 to form an integrated unit. Likewise, modules 28, 30, 32, 34, 36, and 46 may be separate from CEM module 16. Thus, the CEM module 16 and modules 28, 30, 32, 34, 36, and 46 may be embodied as one or more processors that perform the operations described herein.

Figure 2A:
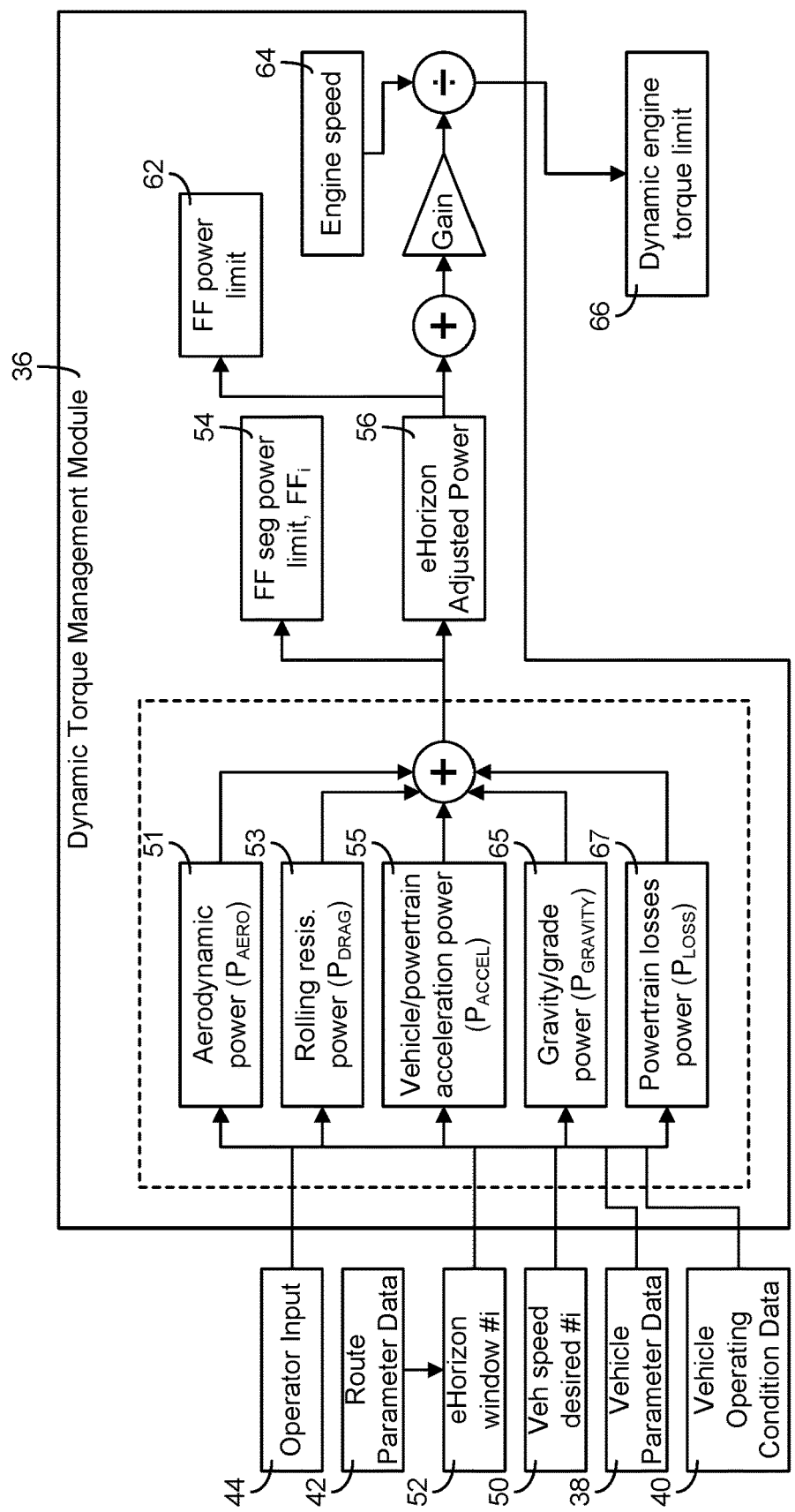
FIG. 2A is a schematic of a process of determining an output torque limit for a route segment of a route of travel for a vehicle according to an example embodiment.
Figure 2B:
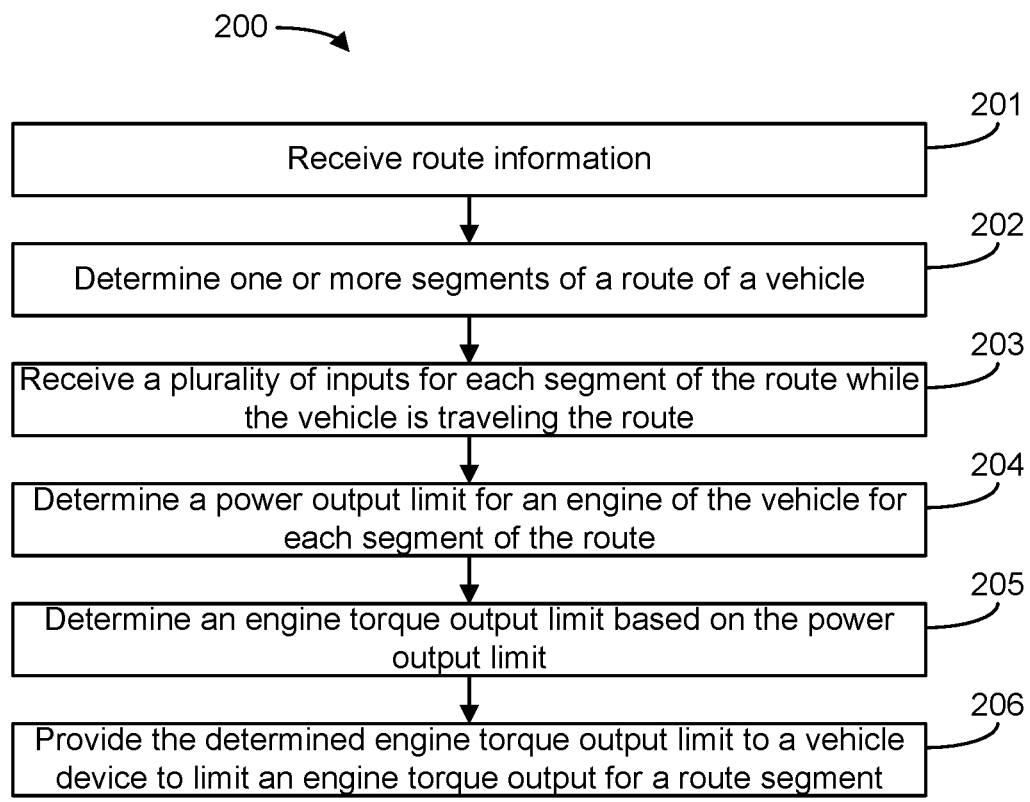
FIG. 2B is a flow diagram of a method of determining an output torque limit for a route segment of a route of travel for a vehicle in accordance with FIG. 2A.

Referring now to FIGS. 2A-2B, a diagram of a process and of a method 200 of determining an output torque limit for a route segment of a vehicle route is shown according to example embodiments. In the example of FIG. 2A, the process is embodied in DTM module 36 of CEM module 16. Method 200 of FIG. 2B is used to show an example implementation of the process in FIG. 2A in a method (i.e., method 200) for determining an output torque limit of an engine and providing that torque limit to one or more vehicle devices to control the vehicle in accord with that limit. As used herein, the term "route" (represented by the forward horizon window shown in FIG. 4) indicates a finite distance of travel for a vehicle (e.g., from one's home to their place of work). Accordingly, via operator interface module 34, an operator may input route information (step 201). The route information may include creating a new route, selecting an existing route, and/or modifying an existing route prior to or during implementation of the method and process described in regard to FIGS. 2A-2B. In another example, a route may be created utilizing a global positioning system unit 22. For example, an operator may enter a start location and an end location. The GPS unit 22 may determine a plurality of travel ways to reach the end location, while the operator may select one of the ways as the "route" to utilize. After the route is identified, the route may be divided into one or more segments by DTM module 36 (step 202: determine one or more segments of a route of the vehicle). The division may be based on time, length, changes in route, etc. In one embodiment, the division is length-based and corresponds with each segment equating or substantially equating to 0.1 mile segments. In another embodiment, the division may be based on changes in altitude of the route indicated by the route parameter data 42 (e.g., substantially uphill portions, substantially downhill portions, and substantially flat portions of the route). For example, the DTM module 36 may divide the route into segments each time the GPS data indicates a change in altitude of the route of more than fifteen percent relative to an initial segment.

After the route is divided into one or more segments, a plurality of inputs are received by the DTM module 36 for each route segment. In one embodiment, the plurality of inputs are received while the vehicle is traveling the route (step 203). DTM module 36 receives the plurality of inputs, from one or more systems and modules of vehicle 10 (e.g., vehicle parameter module 28, vehicle operating condition module 30, route parameter module 32, operator interface module 34, and VSM/OCM module 48). DTM module 36 may also receive vehicle parameter data 38 from operator interface and display 24 that the vehicle operator has entered into operator interface and display 24. DTM module 36 receives GPS data and may receive other terrain data from route parameter module 32, which may receive such data from GPS unit 22. DTM module 36 may also receive route parameter data from non-transitory storage medium 46.

In one embodiment, at least one of the plurality of inputs is received in real-time as the vehicle 10 is traveling the route (i.e., step 203). Accordingly, vehicle 10 may include a plurality of sensors (wind sensor, torque sensor, etc.) that transmits the dynamic vehicle data to the DTM module 36.

Figure 4:
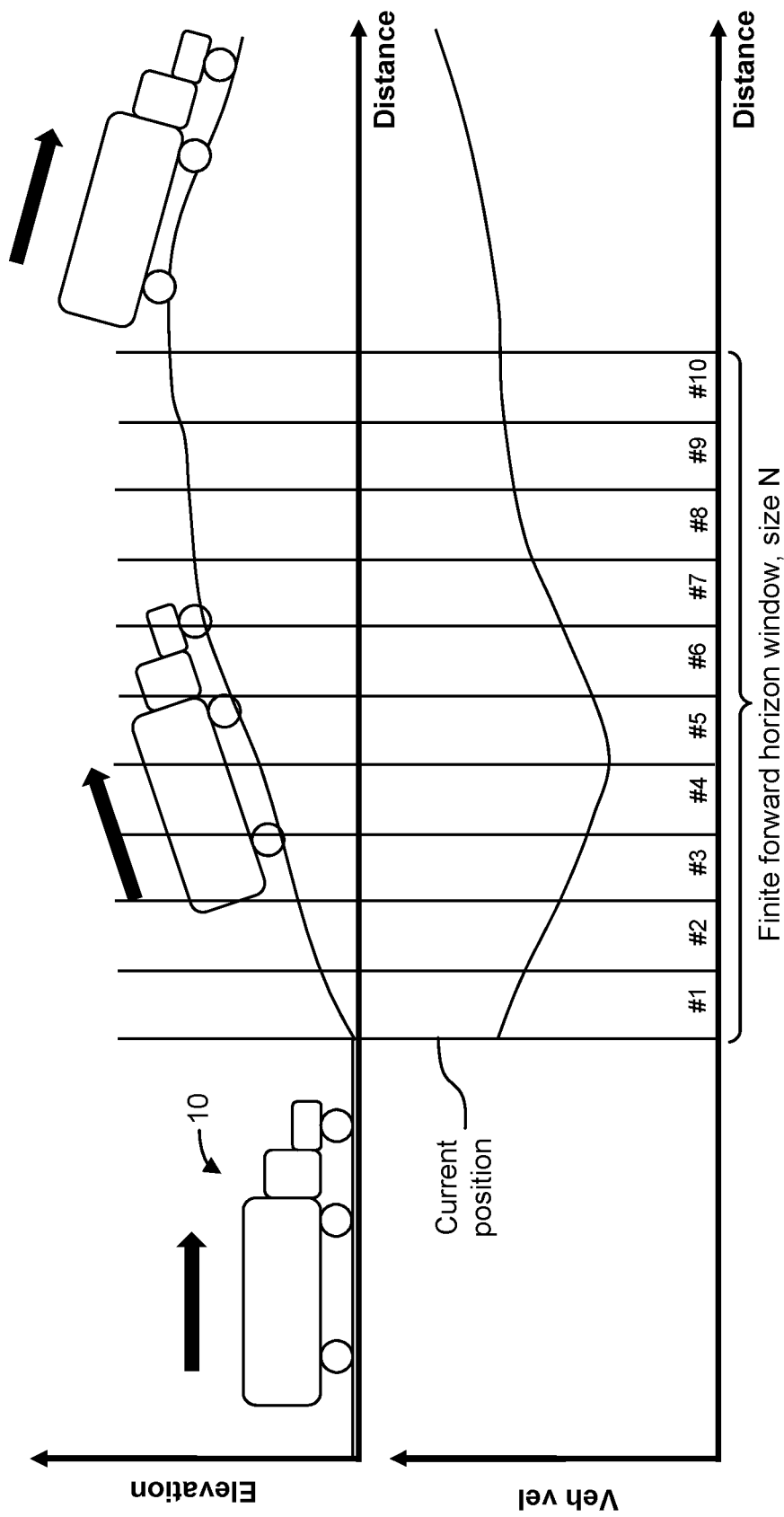
FIG. 4 is a diagram of a vehicle traveling over a route utilizing the process of FIGS. 2A-2B according to an example embodiment.

In another embodiment, route parameter data 42 (e.g., GPS data) or other data may be received in advance of vehicle 10 traveling the route (e.g., retrieved from non-transitory storage medium 46). In turn, the torque limit may be determined in advance of the vehicle reaching each route segment. As shown in FIG. 4 while the vehicle is traveling the route, the plurality of inputs may be received prior to or substantially at each transition to a subsequent route segment. Thus, using the calculations shown below, the determined torque limit may be tailored to current vehicle operating conditions based on the current vehicle position so to optimize fuel economy.

Thus, the plurality of inputs may include dynamic vehicle data, including an operator input 44, route parameter data 42, eHorizon Window segment identifier 52, desired vehicle speed per segment 50, vehicle parameter data 38, and vehicle operating condition data 40. Vehicle parameter data 38, which may be provided by vehicle parameter module 28, non-transitory computer medium 46, or another source, includes vehicle mass, vehicle aerodynamic coefficient, tire dynamic rolling resistance, tire static rolling resistance, tire circumference, radius or diameter, a lookup table for the a final drive torque loss, a lookup table for a transmission torque loss, and a lookup table for an engine torque loss. Vehicle operating condition data 40, which may be provided by vehicle operating condition module 30, includes the vehicle velocity or speed, an inertia of each wheel, an inertia of the final drive, an inertia of the transmission, and an inertia of the engine. Route parameter data 42, which includes GPS data, is provided by route parameter module 32 and includes road slope, air density, latitude, longitude, altitude, speed limit changes, and other similar information. An operator input 44 enables an operator to provide a degree of control over the vehicle. The operator may program one or more preferences for how the operator wishes the vehicle to behave during the course of the route. Accordingly, the operator can, among other things, specify such preferences as the coasting distance desired to traverse, maximum vehicle speed, a torque limit, distance to use in acquiring current vehicle operating conditions (distance interval), etc. For example, if it is known that a speed change is a mile ahead and the operator desires to coast down for only half the distance, the operator can enter 0.5 mile as the distance to coast before reaching the low speed. Example embodiments provide for the operator to specify preferences via operator interface and display 24, and to enter them at the start of the route. One preference might be entered as the actual desired coasting distance for any coasting event, or in the form of a table from which the operator can select a coasting distance for a given start and end coasting speed. Another example preference may include a maximum acceleration, which may affect the maximum permissible torque output from engine and transmission 14. Alternatively, the selections or preferences may be made via a slider bar indicating whether the operator would desire some percentage of the maximum possible coasting distance or acceleration.

Based on the vehicle dynamics per segment of the route, the DTM module 36 determines the aerodynamic power ($P_{Aero}$) 51, the rolling resistance power ($P_{Drag}$) 53, the vehicle/powertrain acceleration power ($P_{Accel}$) 55, the gravity power ($P_{Gravity}$) 65, and the powertrain losses power ($P_{Loss}$) 67. The corresponding calculations are disclosed and described herein. After determination, the powers are summed for each segment. This result is provided to eHorizon Adjust Power process 56 and is denoted at process 54, the feedforward segment power limit. The power determination is made for each segment in the route. The power determination corresponds with the power required or substantially required for the vehicle to travel through the route segment (step 204). Accordingly, this power determination refers to a power output limit (i.e., a maximum power) because increasing the power output beyond this amount would adversely impact fuel economy and be unnecessary as the vehicle has a sufficient amount of power to travel through the route segment at the desired speed (step 204). After power for each segment is computed, each segment power ($FF_i$) (see FIG. 3) is combined to determine the eHorizon Adjusted Power (process 56). The vector of segment powers ($FF_{i=1}$ to $FF_{i=N}$) is transformed into a scalar quantity by DTM module 36. In one embodiment, the eHorizon Adjusted Power determined at process 56 is a limit applied to the current vehicle position for 1=1 to N. This limit is denoted by process 62. In some embodiments, the final power limit includes a gain offset (see FIG. 2) to reflect additional performance/fuel economy tradeoffs. For example, to favor fuel economy, the gain may reduce the power summation by a specific percentage (e.g., five percent) in order to reduce the limit of determined engine torque (and corresponding power output per segment).

The result of the DTM module 36 is a determined torque limit 66 for the engine for each segment of a route (step 205). The torque limit corresponds with a maximum power requirement (i.e., power output limit of step 204) for the vehicle to travel through each route segment based on a desired vehicle speed based on the current vehicle position. As described more fully herein, the summation of powers may be represented by equation (1), while the torque limit determination (process 66) is shown in equation (2), where the term $\omega_{Eng-Out}$ represents the angular velocity of the engine.

$$P_{Propulsion} = \qquad\qquad\qquad\qquad\qquad\qquad\qquad \text{Equation (1)}$$
$$P_{Eng-Out} = P_{Aero} + P_{Drag} + P_{Gravity} + P_{Accel} + P_{Loss}$$

$$T_{Eng-Out} = \frac{P_{Eng-Out}}{\omega_{Eng-Out}} \qquad\qquad\qquad \text{Equation (2)}$$

When vehicle 10 changes position (see FIG. 4) (e.g., i=0 to i=1), the processes described above are re-performed for the new finite forward horizon window. Previously calculated values may be invalid since vehicle velocity conditions may have changed (same as other dynamic vehicle data). Accordingly, the DTM module 36 determines the amount of power needed or substantially need for current and future maneuvers (e.g., i=0 to i=1 then i=1 to i=2 and so on), applies this amount as a limit to minimize significant power variations.

In certain embodiments, the determined engine torque output limit is provided (by, e.g., CEM module 16) to a vehicle device to limit the engine output torque in accordance with the determined limit (step 206). When applied, the torque limit limits the engine output torque to mitigate deviations in torque while the vehicle maintains a desired speed (i.e., desired vehicle speed 50) while experiencing variations in vehicle operating conditions and route parameter data. For example, the torque limit may be adjusted down by DTM module 36 when approaching a downhill portion of a route due to a relatively smaller amount of torque required or substantially required to achieve the desired speed. As mentioned above, the vehicle devices may include, but are not limited to, one or more of an operator input/output module (e.g. operator interface module 34)

and/or an engine and/or a transmission controller. When embodied as the operator input/output module, instructions and/or information is provided to the operator of the vehicle to drive/control the vehicle to maintain the output torque below the torque limit. When embodied as an engine and/or a transmission controller (e.g., ECM 18, TCU 20, described herein), the output torque of the engine is controlled in accordance with the determined torque output limit.

In one embodiment, the power and/or torque limit may come from an operator input 44. For example, an operator, via interface module 34, may enter a torque limit (i.e., receive an input, which corresponds with step 203). In this embodiment, the operator inputted torque limit represents the lower bound. Accordingly, the CEM module 16 prevents or substantially prevents the determined torque limit from dropping below the operator's inputted torque limit. The operator may use such a feature when fuel economy is relatively less important as compared to available (i.e., not limited) power from the engine. In an alternative embodiment, the operator-inputted torque limit does not represent the lower bound. Rather, the CEM module 16 may utilize the minimum torque limit, whether operator-inputted or determined by DTM module 36. For example, if the DTM module 36 determines a torque output limit above the operated-inputted torque limit, the CEM module 16 would utilize the operator-inputted torque limit as the torque limit. If the determined torque output limit is less than the operator-inputted torque limit, then the CEM module 16 would utilize the determined torque output limit to limit the engine output torque. In another embodiment, the CEM module 16 may always utilize the highest torque output limit, whether operator-inputted or determined by the DTM module 36. This embodiment may be utilized when an operator desires power over fuel economy. In any of the implementations (operator-inputted torque limit represents lower bound, always utilize minimum torque limit, always utilize maximum torque limit), an operator may periodically, during operation, and/or at their discretion adjust the effect the operator-inputted torque limit may have via operator input 44.

Figure 3:
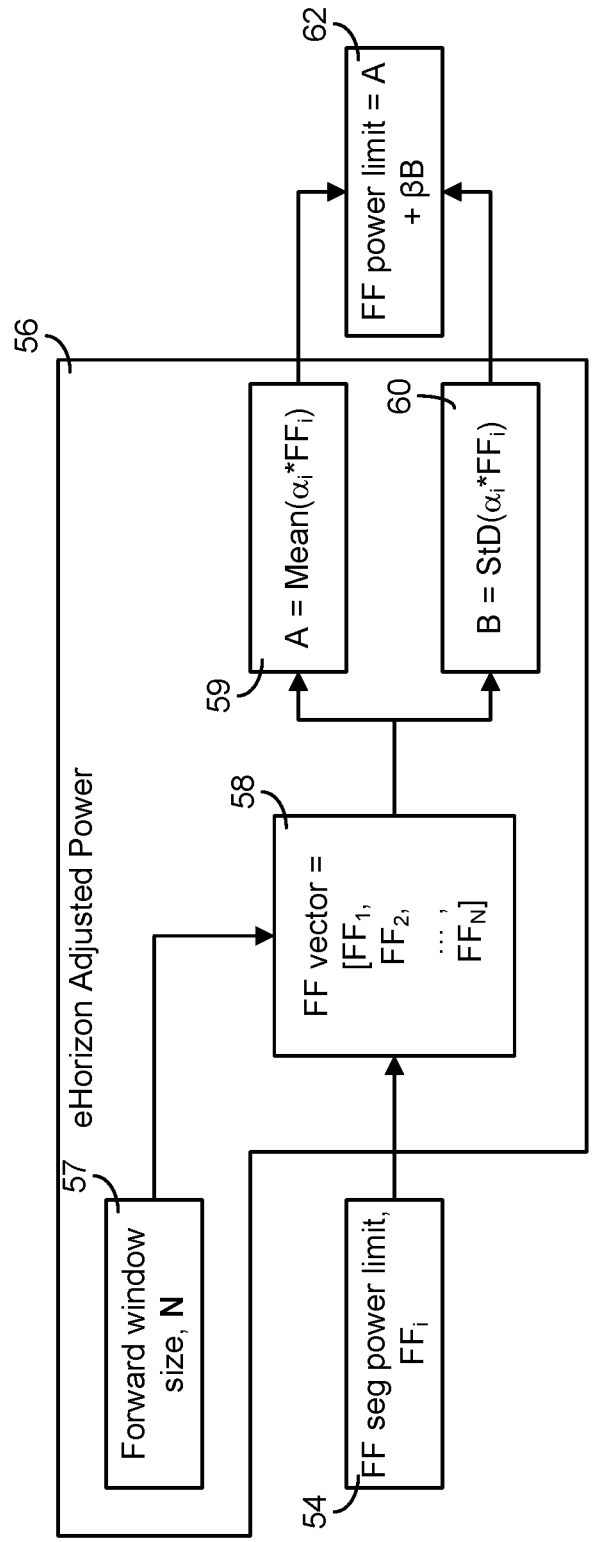
FIG. 3 is a diagram of a sub-process of the process of FIG. 2A in accordance with an example embodiment.

Referring to FIG. 3, a schematic of process 56, eHorizon Adjusted Power, is shown according to an example embodiment. For each route segment, process 56 receives the segment power limit 54. The power limits for each segment of a forward window (size N) 57 are compiled into a vector at 58. As mentioned above, the DTM module 36 makes new determinations for each route segment change. Thus, the eHorizon Adjusted Power is a limit applied to the current vehicle position. As mentioned above, the feedforward power limit vector is translated to a scalar quantity, the result is shown at 62. In the example of FIG. 3, the scalar quantity is a function of the average (process 59) and standard deviation (process 60) of the power limits. The variables α and β may be adjusted/predetermined for each application to achieve various effects. For example, where fuel economy is less important, β may be increased, which corresponds with an increase to the power limit 62. Although shown as a combination of a mean and a standard deviation, the conversion to a scalar quantity may take a variety configurations and combinations (e.g., a median value only, the lowest power limit only, the highest power limit only, etc.). Accordingly, the power limit may be adjusted/set based on the sub-processes utilized by process 56.

Referring to FIG. 4, operation of the processes of the DTM module 36 for a vehicle 10 is shown according to an example embodiment. In the example of FIG. 4, the route has been divided into ten segments (i=1 to i=10). As shown, the velocity of the vehicle decreases as the vehicle is traveling uphill (i=3 to i=5). If an operator wishes to maintain the vehicle speed at position 1, the operator may shift gears and/or depress the accelerator pedal. If cruise control set, the ECM or CEM 16 may increase engine speed to increase vehicle speed. In comparison, the DTM module 36 takes into consideration in real-time what is happening with the vehicle via the received dynamic vehicle data (e.g., route parameter data 42 shows an altitude increase, which indicates the vehicle 10 is traveling uphill). In turn, the determined torque limit is the torque required for the vehicle to make the next maneuver (e.g., travel through a first segment to a second segment). Thus, to account for the possibility of changing vehicle dynamics between each segment, each time a vehicle changes segments, the DTM module 36 makes new a torque limit determination.

As a general example, suppose a vehicle is traveling on a route that is 1.5 miles long at 55 miles-per-hour and that the operator of the vehicle desires to maintain this speed throughout the route. The first mile of the route is substantially flat while the last half mile is a hill, where the peak of the hill occurs at approximately 1.25 miles. The DTM module 36 may divide the route into three segments: the substantially flat portion (~1 mile), the uphill portion (~0.25 mile), and the downhill portion (~0.25 mile). Although three segments is chosen for ease of explanation, an increased amount of segments may provide better torque control and better fuel economy because an additional amount of determinations for optimum torque is made for the route (i.e., the torque is optimized in more places throughout the route). At the beginning of the second segment (uphill), the velocity of the vehicle will start to decrease. Accordingly, the torque limit for segment one likely does not correspond with the torque limit for segment two (i.e., a relatively greater amount of torque may be needed in segment two to keep the vehicle at 55 miles-per-hour uphill). The DTM module 36 accounts for this positional change by making new determinations at each segment change. Without the DTM module 36, an operator may manually (shift gears and/or depress the accelerator pedal) adjust the vehicle speed or rely on a cruise control feature. However, an operator or a cruise control feature is likely to create an output torque in excess of a maximum torque required to achieve the desired speed of 55 miles-per-hour. In comparison, the DTM module 36 determines a torque limit that satisfies the power requirements to achieve the desired speed without substantially over-shooting the maximum required torqued. In turn, a decrease in fuel consumption and an increase in efficiency may be experienced because the DTM module 36 is taking into consideration various dynamic vehicle data (e.g., wind resistance, rolling resistance, etc.).

Figure 5:
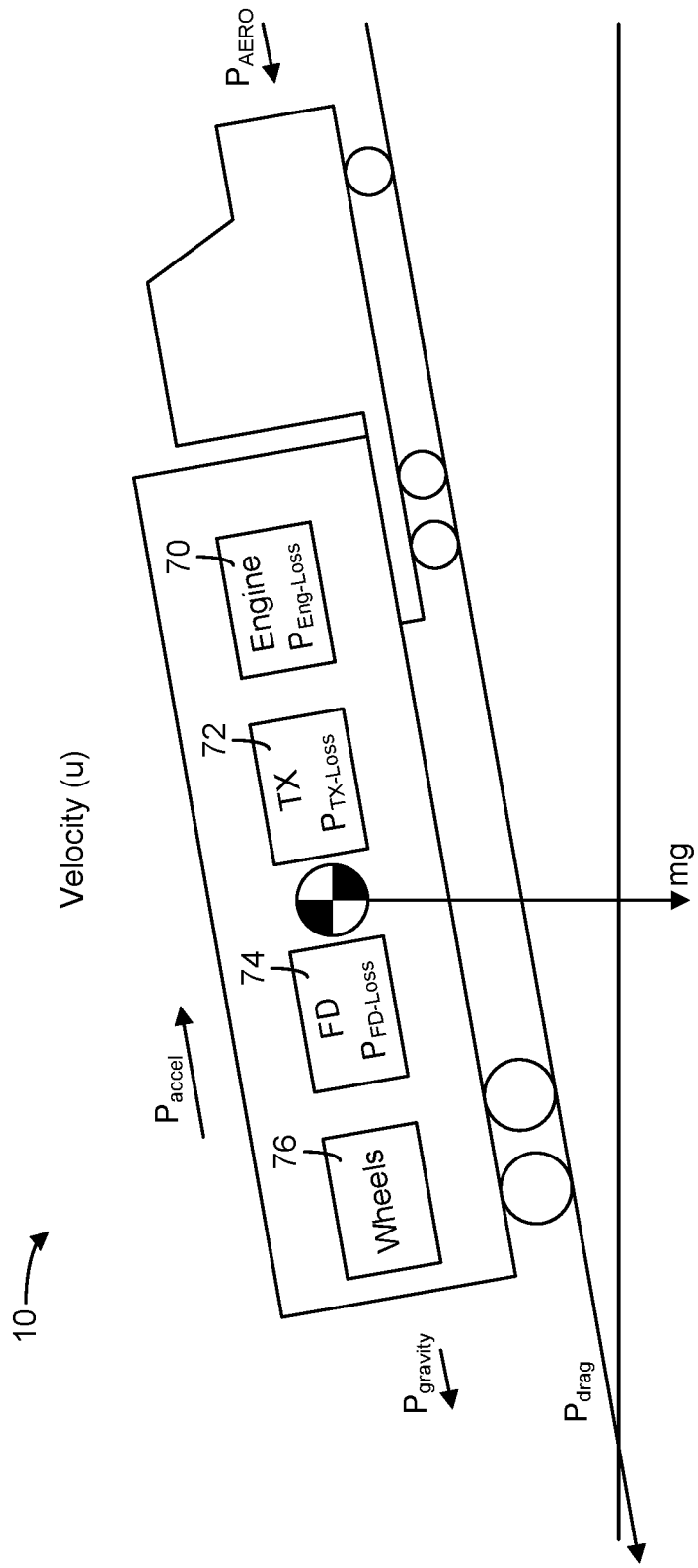
FIG. 5 is a schematic of the vehicle of FIG. 1 showing the power required to overcome various forces related to operation of the vehicle.

Referring to FIG. 5, a schematic of vehicle 10 is shown that indicates the power required to overcome various forces associated with vehicle 10. Generally, vehicle 10 includes an engine 70, a transmission 72, a final drive 74, and wheels 76. As mentioned above, in no particular order, the powers associated with vehicle 10 include $P_{Aero}$, the engine power required to overcome aerodynamic or wind resistance, $P_{Accel}$, which is the power required to accelerate vehicle 10, $P_{Drag}$, which is the power required to overcome the drag of wheels 76, and $P_{Gravity}$, which is the power required to overcome the force of gravity. Additionally, engine 70 also needs to overcome $P_{Eng-Loss}$, which is equivalent to the efficiency of engine 70, $P_{TX-Loss}$, which is the efficiency of transmission 72, and $P_{FD-Loss}$, which is the efficiency of final drive 74. As will be seen, some of these powers include multiple sources.

The power consumed for propelling a vehicle $P_{Propulsion}$, which is equivalent to the power from engine 70, $P_{Eng-Out}$, may be determined from Equation (1).

$$P_{Propulsion}=P_{Eng-Out}=P_{Aero}+P_{Drag}+P_{Gravity}+P_{Accel}+P_{Loss} \quad \text{Equation (1)}$$

Each of these terms is calculated using inputs from a variety of locations, as previously described and shown, for example, in FIG. 2. The power to overcome the aerodynamic drag or wind resistance of vehicle 10, $P_{Aero}$, may be calculated from Equation (3).

$$P_{Aero}=\left(\frac{A \cdot C_D \cdot \rho \cdot u^2}{2}\right) \cdot u \quad \text{Equation (3)}$$

In Equation (3), $A \cdot C_D$ is the vehicle aerodynamic drag area (A) times the aerodynamic drag coefficient ($C_D$), which is a measure of aerodynamic resistance of a cross-sectional area. The term $\rho$ is the air density, and the term u is the velocity or speed of vehicle 10.

The next term, the power required to overcome wheel drag, may be calculated using Equation (4).

$$P_{Drag}=[(C_{rr-dyn})(m \cdot g \cdot \cos \theta)(u)+(C_{rr-static})(m \cdot g \cdot \cos \theta)](u) \quad \text{Equation (4)}$$

The term $C_{rr-dyn}$ is the wheel dynamic rolling resistance and the term $C_{rr-static}$ is the wheel static rolling resistance. The term m is the mass of vehicle 10, the term g is the acceleration due to gravity, and the term $\theta$ is a road slope. Equation (4) may be simplified to the form of Equation (5).

$$P_{Drag}=[(C_{rr-dyn})(u)+(C_{rr-static})](m \cdot g \cdot \cos \theta)(u) \quad \text{Equation (5)}$$

The power required to overcome the force due to gravity may be found from Equation (6), which uses previously defined terms.

$$P_{Gravity}=(m \cdot g \cdot \sin \theta)(u) \quad \text{Equation (6)}$$

The power required to accelerate vehicle 10 consists of multiple components, including $P_{Veh-Accel}$, which is the power required to accelerate the vehicle alone, $P_{Whl-Accel}$, which is the power to accelerate wheels 76, $P_{FD-Accel}$, which is the power required to accelerate final drive 74, $P_{TX-Accel}$, which is the power required to accelerate transmission 72, and $P_{Eng-Accel}$, which is the power to accelerate engine 70. The required calculation is shown in Equation (7).

$$P_{Accel}=P_{Veh-Accel}+P_{Whl-Accel}+P_{FD-Accel}+P_{TX-Accel}+P_{Eng-Accel} \quad \text{Equation (7)}$$

Each of these terms may be individually calculated. The power required to accelerate the vehicle may be found from the vehicle mass m, the vehicle acceleration a, and the vehicle velocity u, as shown in Equation (8).

$$P_{Veh-Accel}=m \cdot a \cdot u \quad \text{Equation (8)}$$

The power required to accelerate wheels 76 may be found from $I_{Whl}$, which is the inertia of wheels 76, $\dot{\omega}_{Whl}$, which is the angular acceleration of the wheels, and $\omega_{Whl}$, which is the angular velocity of the wheels, as shown in Equation (9).

$$P_{Whl-Accel}=I_{Whl} \cdot \dot{\omega}_{Whl} \cdot \omega_{Whl} \quad \text{Equation (9)}$$

The power required to accelerate final drive 74 may be found from $I_{FD}$, which is the inertia of final drive 74, $\dot{\omega}_{FD}$, which is the final drive angular acceleration, and $\omega_{FD}$, which is the final drive angular velocity, as shown in Equation (10).

$$P_{Whl-Accel}=I_{FD} \cdot \dot{\omega}_{FD} \cdot \omega_{FD} \quad \text{Equation (10)}$$

The power required to accelerate transmission 72 may be found from $I_{TX}$, which is the inertia of transmission 72, $\dot{\omega}_{TX}$, which is the transmission angular acceleration, and $\omega_{TX}$, which is the transmission angular velocity, as shown in Equation (11).

$$P_{TX-Accel}=I_{FD} \cdot \dot{\omega}_{TX} \cdot \omega_{TX} \quad \text{Equation (11)}$$

The power required to accelerate engine 70 may be found from $I_{Eng}$, which is the inertia of engine 70, $\dot{\omega}_{Eng-Out}$, which is the engine angular acceleration, and $\omega_{Eng-Out}$, which as mentioned above is the engine angular velocity, as shown in Equation (12).

$$P_{Eng-Accel}=I_{TX} \cdot \dot{\omega}_{Eng-Out} \cdot \omega_{Eng-Out} \quad \text{Equation (12)}$$

Each of the angular velocities and angular accelerations may be derived from data provided in the vehicle parameters in conjunction with the vehicle acceleration and velocity.

The final term, $P_{Loss}$, is a summary of the losses that need to be overcome in vehicle 10. These losses may be summarized as in Equation (13).

$$P_{Loss}=P_{FD-Loss}+P_{TX-Loss}+P_{Eng-Loss} \quad \text{Equation (13)}$$

The loss from final drive 74 may be calculated from $\Im(\omega_{FD-in} \cdot \tau_{FD-in})$, which may be found in a lookup table of the final drive torque loss, and $\omega_{FD-in}$, which is the angular velocity of the final drive at the input, as shown in Equation (14).

$$P_{FD-Loss}=\Im(\omega_{FD-in} \cdot \tau_{FD-in}) \cdot \omega_{FD-in} \quad \text{Equation (14)}$$

The loss from transmission 72 may be calculated from $\Im(\omega_{TX-in} \cdot \tau_{TX-in})$, which may be found in a lookup table of the transmission torque loss, and $\omega_{TX-in}$, which is the angular velocity of the transmission at the input, as shown in Equation (15).

$$P_{TX-Loss}=\Im(\omega_{TX-in} \cdot T_{TX-in}) \cdot \omega_{TX-in} \quad \text{Equation (15)}$$

The loss from engine 70 may be calculated from $\Im(\omega_{Eng-out})$, which is found in a lookup table of the engine torque loss, as shown in Equation (16).

$$P_{Eng-Loss}=\Im(\omega_{Eng-Out}) \cdot \omega_{Eng-Out} \quad \text{Equation (16)}$$

The power consumed in propelling vehicle 10 may now be shown in terms of all the powers required, as shown in Equation (17).

$$P_{Eng-Out}=P_{Aero}+P_{Drag}+P_{Gravity}+(P_{Veh-Accel}+P_{Whl-Accel}+P_{FD-Accel}+P_{TX-Accel}+P_{Eng-Accel})+(P_{FD-Loss}+P_{TX-Loss}+P_{Eng-Loss}) \quad \text{Equation (17)}$$

Even though $P_{Eng-Loss}$ is shown in Equation (17), it may be accounted for elsewhere, for example it may be integral to $P_{Eng-Out}$ and may not need to be explicitly included in Equation (16).

The DTM module 36 uses these calculations to determine the optimum torque limit (equation (2)) for each segment in the horizon window (i.e., route). In some embodiments, the values utilized in the above equations are measured/recorded from various vehicle sensors. For example, in regard to vehicle operating condition data 40, the velocity of the vehicle may be measured by a speed sensor and provided to the DTM module 36. In certain embodiments, one or more of the dynamic vehicle data is estimated rather than measured/recorded. For example, over time, the coefficient of friction between the wheels and the road ($C_{rr-dyn}$ and $C_{rr-static}$) may decrease due to a decreasing amount of tired tread. Because a measurement may not be readily available, the DTM module 36 may apply estimate the coefficients of friction over time (e.g., use a look-up table for mileage versus friction coefficient for that specific tire).

Figure 6:
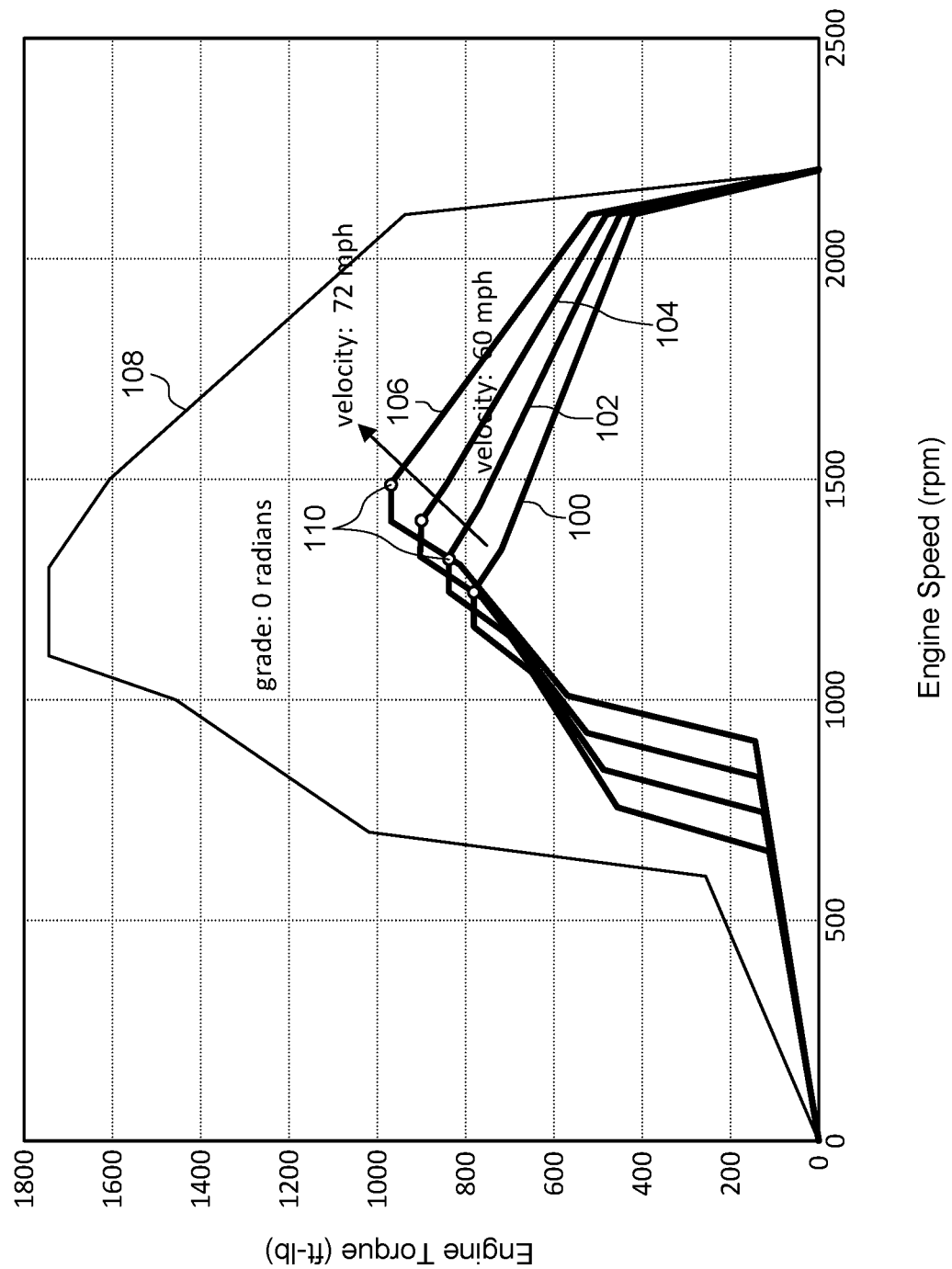
FIG. 6 is a graph showing example torque curves determined by the process of FIGS. 2A-2B for different vehicle speeds.

In certain embodiments, the result of the calculations described hereinabove results in one or more torque limit curves. FIG. 6 shows example torque limit curves for a road grade of zero radians and four different velocities, 60 mph at curve 100, 64 mph at curve 102, 68 mph at curve 104, and 72 mph at curve 106. The maximum available torque for vehicle 10 is shown at curve 108. As shown, the determined torque output limit is less than the maximum available torque of the engine. By comparing the engine torque at a reference point 110 to a corresponding location on maximum torque curve 108, a ratio of the torque limit to the maximum available torque limit is established, which is then used to limit the torque over the range of operation of the engine of vehicle 10. It is readily apparent that limiting the output torque of the engine of vehicle 10 to the optimal torque necessary to achieving the speeds shown in FIG. 6 will reduce the amount of fuel needed in engine 70, which will improve the efficiency of engine 70, reduce fuel consumption in engine 70, and decrease the undesirable generation of emissions in engine 70. Furthermore, these torque limit curves may be calculated based on either future events or on current or present events, using data provided by, for example, route parameter module 32. Thus, DTM module 36 provides the capability to establish either future or present performance limits for engine 70.

Figure 7:
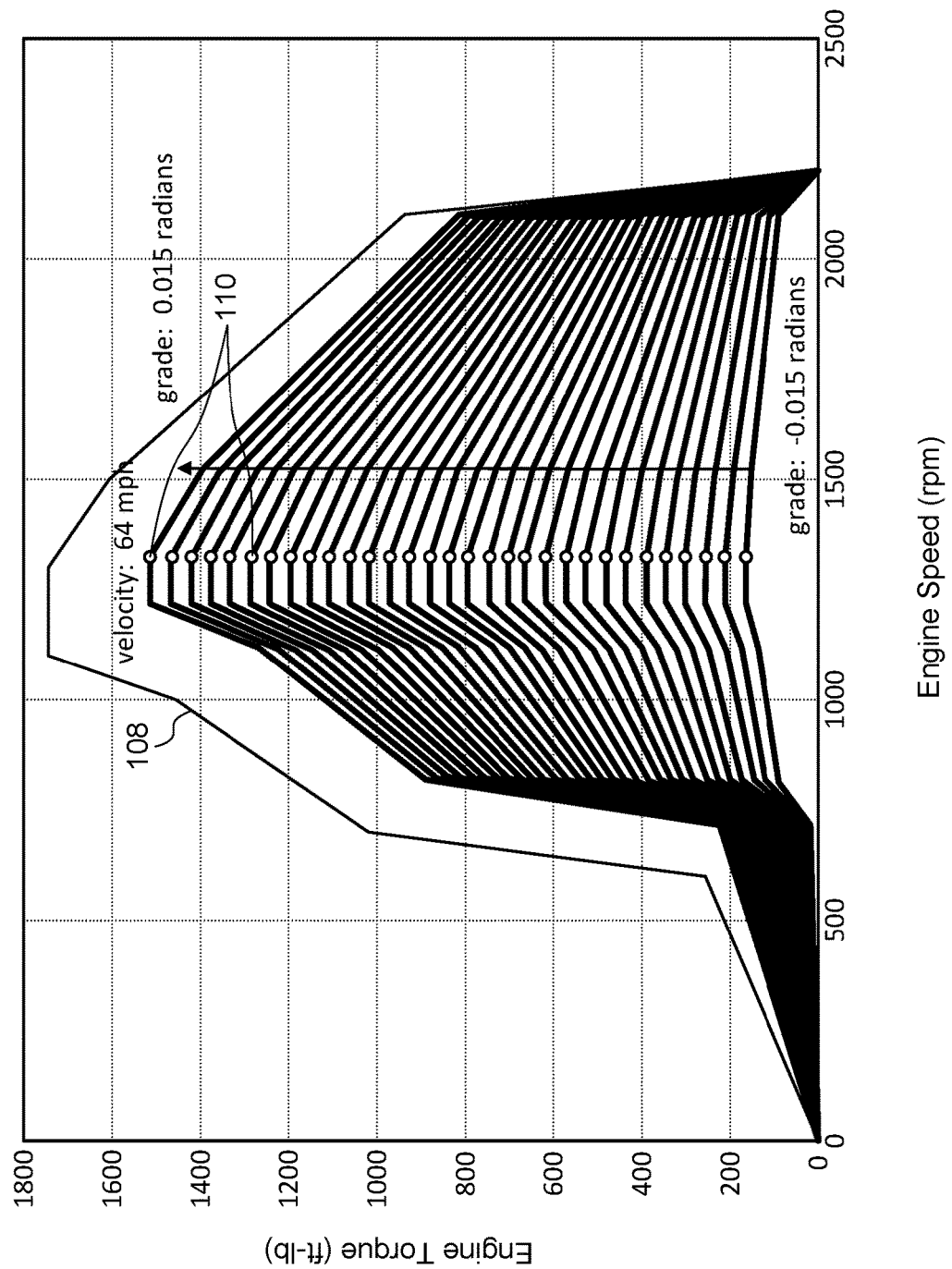
FIG. 7 is graph showing example torque curves determined by the process of FIGS. 2A-2B for different road grades for a fixed vehicle speed.

Another example set of torque limit curves is shown in FIG. 7, where vehicle 10 is traveling at a constant speed of 64 mph, with each torque limit curve representing a slope increment of 0.001 radians from −0.015 radians to +0.015 radians. As with FIG. 6, torque curve 108 represents the maximum available torque output from engine 70. Once the torque is determined at a reference point 110, a ratio between a corresponding point on maximum torque curve 108 to referent point 110 is determined, and the ratio is used to limit the torque for a particular vehicle 10 operating condition. Because DTM module 36 has anticipated the grades shown in FIG. 7, engine 70 is limited to the optimal output torque or power required to propel vehicle 10 up or down any of the slopes shown in FIG. 7, engine 70 is operated at optimal efficiency, increasing the fuel efficiency of engine 70.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

What is claimed:

1. An apparatus comprising:
a cycle efficiency management circuit including:
a parameter circuit structured to receive a plurality of inputs including at least one of route parameter data, vehicle parameter data, or vehicle operating condition data, and a dynamic torque management circuit structured to: determine one or more segments of a route, associate the plurality of inputs with one or more segments of the route, determine a power output limit for a current segment of the route based on a scalar quantity derived from two or more forward segments in the route, and
generate an engine torque output limit based on the power output limit; and
an engine control circuit structured to receive the engine torque output limit and to limit an engine torque output for the current segment of the route,
wherein the scalar quantity is a function of an average and a standard deviation of determined power output limits.

2. The apparatus of claim 1, wherein the power output limit is determined for each segment of the route sequentially.

3. The apparatus of claim 1, wherein the power output limit is a maximum amount of power required to travel through each route segment while substantially maintaining a desired vehicle speed.

4. The apparatus of claim 1, wherein receiving the plurality of inputs for each segment of the route occurs while traveling the route.

5. The apparatus of claim 1, wherein the engine torque output limit is less than a maximum available torque.

6. The apparatus of claim 1, wherein the scalar quantity is a function of a variable that is proportional to the power output limit, and
wherein the dynamic torque management system is structured to retrieve the variable from a look-up table.

7. The apparatus of claim 6, wherein the variable is inversely proportional to fuel economy.

8. A non-transitory computer-readable storage medium having machine instructions stored therein, the instructions being executable by a processor to cause the processor to perform operations, comprising:
receiving identification of a route of travel of a vehicle determining one or more segments of the route;
receiving a plurality of inputs for each segment of the route, wherein the plurality of inputs includes at least one of route parameter data, a desired vehicle speed, vehicle parameter data, or vehicle operating condition data;
determining a power output limit for an engine of the vehicle for a current segment of the route based on a scalar quantity derived from two or more forward segments;
determining an engine torque output limit based on the power output limit; and
limiting an engine torque output for the current segment based on the determined engine torque output limit,
wherein the scalar quantity is a function of an average and a standard deviation of determined power output limits.

9. The non-transitory computer readable medium of claim 8, further comprising determining a power output limit each time the vehicle reaches a subsequent segment of the route.

10. The non-transitory computer readable medium of claim 8, wherein the power output limit is a maximum amount of power required for the vehicle to travel through each route segment while substantially maintaining the desired vehicle speed.

11. The non-transitory computer readable medium of claim 8, wherein the determined engine torque limit is less than a maximum available torque of the engine.

12. The non-transitory computer readable medium of claim 8, wherein the scalar quantity is a function of a variable that is proportional to the power output limit, and
wherein the variable is retrieved from a look-up table.

13. The non-transitory computer readable medium of claim 12, wherein the variable is inversely proportional to fuel economy.

14. A method of operating a torque management system for an internal combustion engine, comprising:
determining, by a processor of the torque management system, one or more segments of a route of a vehicle;
receiving, by the processor, a plurality of inputs for each segment of the route, wherein the plurality of inputs includes at least one of route parameter data, vehicle parameter data, or vehicle operating condition data;

receiving, by the processor, a preference regarding at least one of a speed for the vehicle, a torque output limit for an engine of the vehicle, and an acceleration amount of the vehicle;

determining, by the processor, a power output limit for an engine of the vehicle for a current segment of the route based on a scalar quantity derived from two or more forward segments;

determining, by the processor, an engine torque output limit based on the power output limit; and providing, by the processor, the determined engine torque output limit to a vehicle device to limit an engine torque output for the current route segment, wherein the scalar quantity is a function of an average and a standard deviation of determined power output limits.

15. The method of claim 14, wherein the scalar quantity is a function of a variable that is proportional to the power output limit, and further comprising retrieving, by the processor, the variable from a look-up table.

16. The method of claim 15, wherein the variable is inversely proportional to fuel economy.

17. The method of claim 14, wherein receiving the plurality of inputs for each segment of the route occurs while the vehicle is traveling the route.

\* \* \* \* \*

UNITED STATES PATENT AND TRADEMARK OFFICE
CERTIFICATE OF CORRECTION

PATENT NO. : 10,328,923 B2  
APPLICATION NO. : 15/789286  
DATED : June 25, 2019  
INVENTOR(S) : An Wu et al.

Page 1 of 1

It is certified that error appears in the above-identified patent and that said Letters Patent is hereby corrected as shown below:

In the Specification

Column 1, Line 6, please add the following heading and paragraph:
-- STATEMENT REGARDING FEDERALLY SPONSORED RESEARCH OR DEVELOPMENT
This invention was made with government support under DE-EE0003403 awarded by the Department of Energy (DOE). The government has certain rights in this invention. --

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*